(12) United States Patent
Lee et al.

(10) Patent No.: US 7,558,230 B2
(45) Date of Patent: Jul. 7, 2009

(54) METHOD FOR CONTROLLING POWER OF HS-SCCH IN MOBILE COMMUNICATION SYSTEM

(75) Inventors: Young Dae Lee, Kyungki-Do (KR); Bong Hoe Kim, Kyungki-Do (KR); Seung Hoon Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 787 days.

(21) Appl. No.: 10/335,432

(22) Filed: Jan. 3, 2003

(65) Prior Publication Data

US 2003/0128673 A1    Jul. 10, 2003

(30) Foreign Application Priority Data

Jan. 5, 2002    (KR) ............ 10-2002-0000629

(51) Int. Cl.
*H04B 7/185* (2006.01)
*H04B 1/04* (2006.01)
*H04B 7/00* (2006.01)
*H01Q 11/12* (2006.01)

(52) U.S. Cl. ............ 370/318; 455/13.4; 455/127.1; 455/522

(58) Field of Classification Search ........... 370/318; 455/13.4, 127.1, 522
See application file for complete search history.

(56) References Cited

U.S. PATENT DOCUMENTS 5,507,018 A * 4/1996 Seppala .......... 455/127.1
6,262,994 B1  7/2001 Dirschedl et al.
6,493,332 B1 * 12/2002 Hirade ............. 370/342
2002/0115464 A1 * 8/2002 Hwang et al. ........ 455/522

FOREIGN PATENT DOCUMENTS

| EP | 1 089 458 A | 4/2001 |
|---|---|---|
| EP | 1 313 231 A1 | 5/2003 |
| EP | 1 313 334 A2 | 5/2003 |
| JP | 2001-069077 | 3/2001 |
| KR | 10-1999-0039333 | 6/1999 |
| KR | 10-2003-0019754 | 3/2003 |
| WO | WO 03/036822 | 5/2003 |

OTHER PUBLICATIONS

Motorola: "Control Channel Structure for High Speed DSCH (HS-DSCH)"; TSGR1/R2-1201002; Apr. 5, 2001; pp. 1-5.
Lucent Technologies: "Text Proposal for the HSDPA Technical Report"; TSGR1 #17 (00) 1384; Nov. 21, 2000; pp. 1-9.
Japanese Office Action dated May 2, 2008 (and English-language translation).
European Search Report dated Feb. 21, 2007.

* cited by examiner

*Primary Examiner*—Alexander Eisen
*Assistant Examiner*—Matthew W Genack
(74) *Attorney, Agent, or Firm*—KED & Associates, LLP

(57) ABSTRACT

Methods for controlling power in a wireless communication system can reduce system power use. Further methods can control power of a HS-SCCH. When a controller (e.g., node B) receives a transmit power control (TPC) command from a UE, it can differentially controls transmission power of part-1 and part-2 constituting a sub-frame of HS-SCCH to be suitable to each UE on the basis of the power control of DL DPCH constructed in each UE and power control of CPICH transmitted (e.g., equally) to every UE. Since the transmission power of HS-SCCH is controlled by differentiating part-1 and part-2, the inter-cell interference can be reduced or minimized and the power of the node B can be effectively used.

14 Claims, 4 Drawing Sheets

METHOD FOR CONTROLLING POWER OF HS-SCCH IN MOBILE COMMUNICATION SYSTEM

BACKGROUND OF THE INVENTION

1. Field of the Invention

The present invention relates to a high speed downlink packet access (HSDPA) and, more particularly, to a power control method of shared control channel for high speed downlink shared channel (HS-SCCH).

2. Background of the Related Art

In general, a wireless system of third generation partnership project (3GPP) proposes a new high speed downlink shared channel (HS-DSCH) in order to support a high speed packet data service. The HS-DSCH is used in a system following a Release 5 that specifies a high speed downlink packet access (HSDPA) among the technical specifications of 3GPP.

Unlike a W-CDMA system of the existing 3GPP Release 99/Release 4, the HS-DSCH uses a short transmission time interval (TTI) (3 slot, 2 ms). Thus, the HS-DSCH has been devised to transmit a high speed user data to different users every 2 ms sub-frame, and uses diverse modulation code sets (MCS) in order to support a high data rate.

In order for a user equipment (UE) to receive a user data, a shared control channel for HS-DSCH (HS-SCCH) and a dedicated physical channel (DPCH) should be constructed. The HS-SCCH, a physical channel, is a type of a downlink common control channel to support the HS-DSCH. HS-SCCH is used to transmit a UE ID-related control information so that the UE can receive the HS-DSCH transmitting a high speed user data. The user equipment monitors HS-SCCH to recognize whether there is a data to be received by itself and receives a user data transmitted through HS-DSCH by using the UE ID-related control information. At this time, the UE ID-related control information is transmitted through each frame (2 ms) of HS-SCCH. The UE ID-related control information is generated by a node B (a base station) to which a cell transmitting HS-DSCH belongs, and transmitted to the UE through HS-SCCH.

The control information transmitted through HS-SCCH is roughly divided into transport format and resource related information (TFRI) and HARQ related information. The TFRI includes a channelization code set during a HS-DSCH TTI, a modulation scheme, a transport block set size and a transport channel identity. The HARQ related information includes a block number and a redundancy version or the like. In addition, a UE ID (identification) is transmitted through HS-SCCH.

However, as described above, power control schemes for HS-SCCH are inefficient. Accordingly, an inter-cell interference is increased and a node B power is not effectively used. Thus, there is a long felt need for improved power control for control channels of mobile communication systems.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a method for controlling transmission power of HS-SCCH in a mobile communication system.

Another object of the present invention is to provide a method for controlling transmission power of HS-SCCH that is capable of reducing an inter-cell interference.

Another object of the present invention is to provide a method for controlling transmission power of HS-SCCH that is capable of applying a differential power control to a part-1 and a part-2.

Another object of the present invention is to provide a method for controlling transmission power of HS-SCCH that is capable of reducing an inter-cell interference and effectively using power of a node B by applying a differential power control to a part-1 and a part-2.

Another object of the present invention is to provide a method for controlling transmission power of HS-SCCH using a DL DPCH and a common pilot channel (CPICH).

Another object of the present invention is to provide a method for controlling transmission power of HS-SCCH that is capable of constantly maintaining transmission power of HS-SCCH during a sub-frame.

To achieve at least the above objects in a whole or in parts, there is provided a method for controlling transmission power of HS-SCCH that transmits control information of a sub-frame divided into a part-1 and a part-2, wherein transmission power of part-1 and part-2 is determined to be different according to a power control command of a UE.

In the method for controlling transmission power of HS-SCCH according to embodiments of the present invention, preferably, the transmission power of part-1 can be controlled by a first power offset (PO1) value relative to the transmission power of CPICH, and the transmission power of part-2 is controlled by a second power offset (PO2) value relative to the transmission power of a slot of DL DPCH.

To further achieve at least these advantages in a whole or in parts, there is provided a method that includes dividing control information of a high speed-shared control channel into a first part and a second part, and controlling a transmission power of the first part and the second part to be different according to a power control command of a UE.

To further achieve at least these advantages in a whole or in parts, there is provided A method for controlling transmission power of a communication system that includes receiving a power control information from a user equipment (UE), setting transmission power of downlink dedicated physical channel (DL DPCH) and common pilot channel (CPICH) according to the received power control information, and determining transmission power of HS-SCCH transmitted to each UE by using first and second power offset (PO) values relative to the set transmission power of CPICH and DL DPCH, respectively.

In the method for controlling transmission power of HS-SCCH according to embodiments of the present invention, preferably, transmission power of part-1 can be determined as a value obtained by adding the first PO value to the transmission power of CPICH and the second PO value is a power offset value relative to one of three slots of DL DPCH.

To further achieve at least these advantages in a whole or in parts, there is provided a method for controlling transmission power of high speed shared control channel (HS-SCCH) in a high speed data packet access (HSDPA) service of a universal mobile telecommunications system (UMTS) system in which a user equipment (UE) receives a user data through a high speed downlink shared channel (HS-DSCH) on the basis of control information transmitted through the HS-SCCH, wherein transmission power of a part-1 and a part-2 constituting a sub-frame of HS-SCCH is controlled to be different based on common information transmitted to a plurality of UE and corresponding information transmitted to a selected UE.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
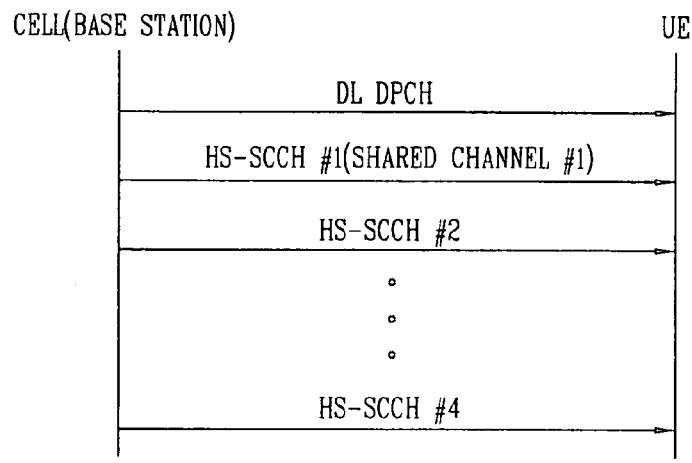
FIG. 1 is a diagram that illustrates a signaling of HS-SCCH for transmitting control information.

For a downlink channel required for one UE for transmission of one HSDPA, there are an associated DPCH, HS-SCCH and HS-DSCH and the like. A related art UMTS radio access network (UTRAN) may configure a plurality of HS-SCCHs in one cell, but as shown in FIG. 1, four HS-SCCHs can be the maximum that can be allocated to one UE.

Figure 2:
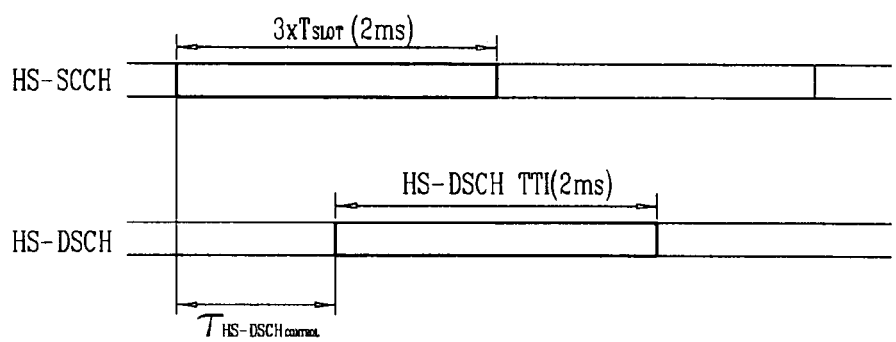
FIG. 2 is a diagram that illustrates a transport timing of HS-SCCH and HSD-SCH.

FIG. 2 illustrates a transport timing of a related art HS-SCCH and HS-DSCH. As shown in FIG. 2, a downlink (DL) DPCH is first transmitted, control information is transmitted through HS-SCCH, and then a data is transmitted through HS-DSCH. The UE recovers HS-DSCH data by using the control information transmitted through HS-SCCH.

As described above, in case that a high speed user data is provided to different users through HS-DSCH proposed in the HSDPA technique, at least one or more HS-SCCHs are configured in one cell. Especially, if there are many HSDPA terminals, a plurality of HS-SCCH should be configured in one cell for an effective data service.

Figure 3:
FIG. 3 is a diagram that illustrates a construction of the control information transmitted through HS-SCCH for 2 ms (e.g., 1 TTI)

FIG. 3 illustrates a construction of the control information transmitted through HS-SCCH. As shown in FIG. 3, the control information of HS-SCCH is divided into a part-1 transmitting a common content and a part-2 transmitting information for a particular UE. The part-1 contains the channelization code set of TFRI and a modulation scheme, while the part-2 contains the transport block set size of TFRI, the transport channel identity and HARQ-related information.

Figure 4:
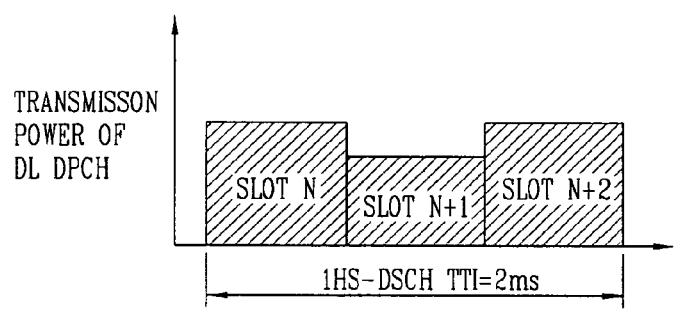
FIG. 4 is a diagram that illustrates a conceptual view of a related art method for controlling transmission power of HS-SCCH.

FIG. 4 is a conceptual view of a method of controlling transmission power of HS-SCCH. In the related art, the part-1 and part-2 transmission power for HS-SCCH are controlled by the same power control method or the same power offset.

Figure 5:
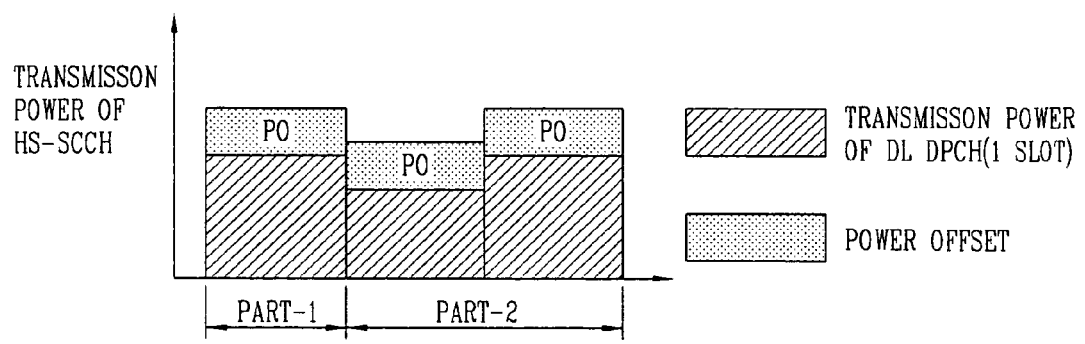
FIG. 5 is a diagram that illustrates one example of a method for controlling transmission power of HS-SCCH of FIG. 4.

For example, as shown in FIG. 5, the transmission power of each slot for part-1 and part-2 is determined as a power offset relative to the transmission power of each slot for DL DPCH. The power offset value (PO) is the same for both part-1 and part-2.

The PO value may change according to a channel environment. For instance, if an associated DPCH is in soft handover, a pre-set PO value is changed to a different PO value.

As described above, in the related art method, the same power control method is applied to both part-1 and part 2 constituting a HS-SCCH sub-frame. Thus, since the part-1 transmitting the common content and the part-2 transmitting information for a particular UE are subjected to the same power control method, an inter-cell interference is increased and a node B power is less effectively used.

A power offset (PO) value for power control of HS-SCCH can be generated by an radio network controller (RNC) or the like and sent to a controller such as a node B (e.g., a base station). Then according to embodiments of the present invention, the node B can apply a different transmission power control method to a part-1 and a part-2 of HS-SCCH on the basis of the received PO value.

When the node B receives a transmit power control (TPC) command from a user equipment UE, it preferably differentially controls transmission power of part-1 and part-2 constituting a sub-frame of HS-SCCH so as to be suitable to each UE on the basis of the power control of DL DPCH constructed in each UE and power control of CPICH that can be transmitted equally to every UE.

Figure 6:
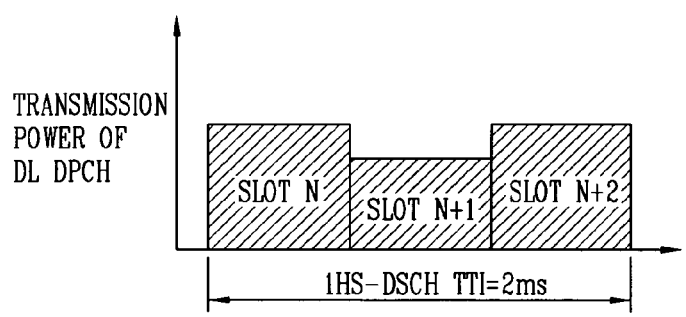
FIG. 6 is a diagram that illustrates a method for controlling transmission power of HS-SCCH in accordance with one embodiment of the present invention.

FIG. 6 is a diagram that shows a method for controlling transmission power of HS-SCCH in accordance with one embodiment of the present invention. In the HS-SCCH of a sub-frame as shown in FIG. 6, the transmission power of part-1 and part-2 can be independently controlled by the first and the second PO values (e.g., PO1 and PO2). The first PO value (PO1) can be defined as a power offset relative to transmission power of CPICH transmitted equally to every UE, and the second PO value can be defined as a power offset relative to the transmission power of DL DPCH transmitted differently to each UE.

The transmission power of part-1 can be transmitted as a high power so that every UE can receive it, while the transmission power of part-2 can be transmitted using a suitable power receivable by a particular UE. Moreover, the present invention is not intended to be so limited as other power relationships and values can be used. Further, the first and the second PO values (PO1 and PO2) can change according to a channel environment. For example, as shown in FIG. 7, if DL DPCH is in soft handover, new first and second values (e.g., PO1 and PO2) different from the previous values can be used.

In addition, different first and second PO values (PO1 and PO2) can be used according to other criteria such as whether a cell, which is transmitting HS-SCCH in a 3GPP WCDMA adopting a site selection diversity transmit (SSDT) technique, is primary or nonprimary.

Using SSDT cell ID transmitted by UE, the node B can determine power offset based on whether DPCH is in soft handover or not, and/or whether a cell is primary or not in case of soft handover. For this purpose, the RNC may send first and second PO values according to whether DL DPCH is in soft handover and/or first and second PO values according to whether cell transmitting HS-SCCH is primary or not, to the node B.

Figure 7:
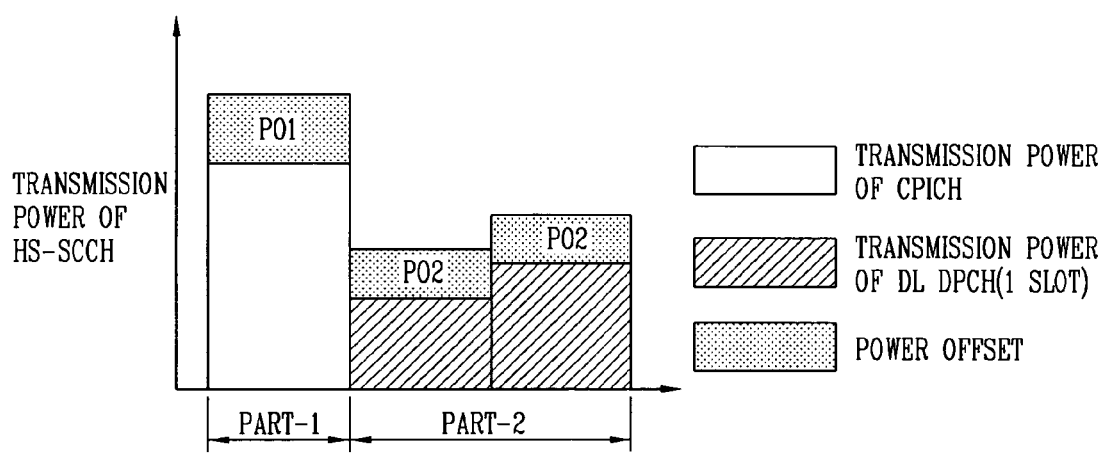
FIG. 7 is a diagram that illustrates one exemplary method of controlling transmission power of HS-SCCH implemented according to FIG. 6.

FIG. 7 is a diagram that illustrates one exemplary method of controlling transmission power of HS-SCCH implemented according to the embodiment of FIG. 6. As shown in FIG. 7, the first PO value (PO1) can be defined as a PO value relative to the transmission power of CPICH, and the second PO value (PO2) can be determined as a PO value relative to each slot of associated DPCH.

Thus, transmission power of part-1 is preferably determined as a value obtained by adding the transmission power of CPICH and the first PO value (PO1), and the transmission power of part-2 is preferably determined as a value obtained by adding transmission power of each slot (e.g., N+1th and N+$2^{nd}$) of DL DPCH, which can be inner loop power controlled in each slot, and the second PO value (PO2). At this time, the transmission power of part-2 of HS-SCCH for a TTI may change in each slot.

If the second PO value (PO2) of part-2 is defined as a power offset relative to each slot of DL DPCH, the second PO value (PO2) can be set to be different according to transmission power of each slot. For example, the second PO value (PO2) can be set as a power offset relative to one of three slots of associated DPCH during a HS-DSCH TTI of 2 ms. Accordingly, transmission power of part-2 can be determined by adding the transmission power of a particular slot of DL DPCH for 1 TTI and the second PO value (PO2). Alternatively, the transmission power of part-2 can be determined by adding an average transmission power of DL DPCH during a certain slot in the past and the second PO value (PO2). Moreover, the present invention is not intended to be so limited as other power relationships and values can be used.

Figure 8:
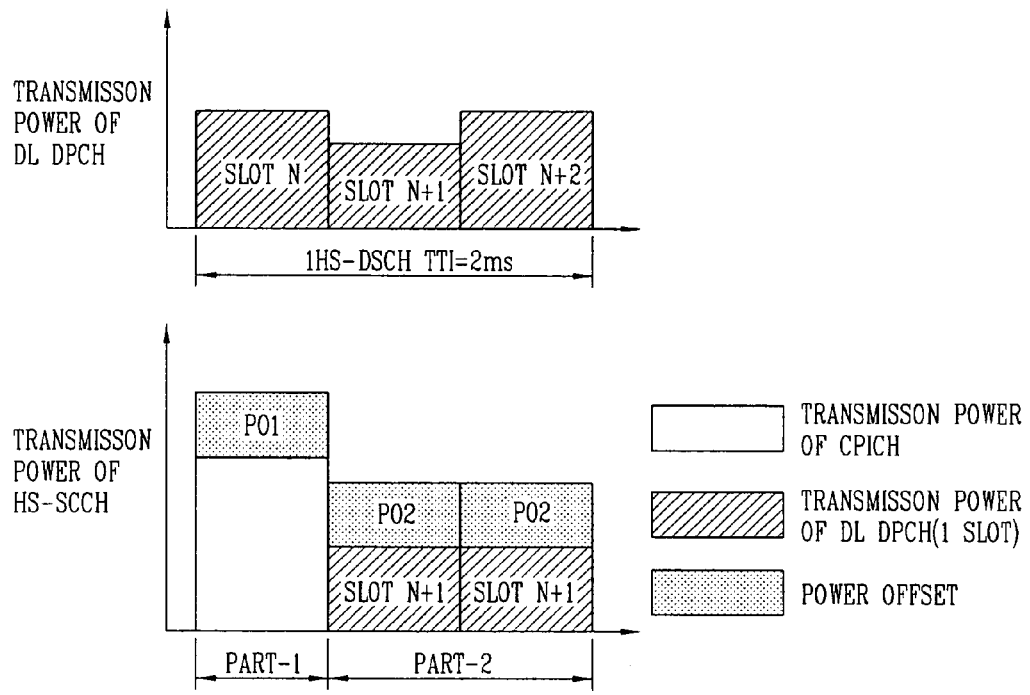
FIG. 8 is a diagram that illustrates another exemplary method of controlling transmission power of HS-SCCH implemented according to FIG. 6.

FIG. 8 is a diagram that illustrates another exemplary method of controlling transmission power of HS-SCCH implemented according to the embodiment of FIG. 6. As shown in FIG. 8, a method for determining transmission power of part-2 can use transmission power of the second slot (e.g., N+1) of DL DPCH.

As shown in FIG. 8, the second PO value (PO2) of part-2 is preferably set as a power offset relative to a selected slot (e.g., the second slot (N+1)) of a plurality of slots (e.g., three slots (N, N+1 and N+2)) of DL DPCH. The transmission power of part-2 is preferably determined as a value obtained by combining (e.g., adding) the transmission power of the second slot of DL DPCH and the second PO value (PO2).

Figure 9:
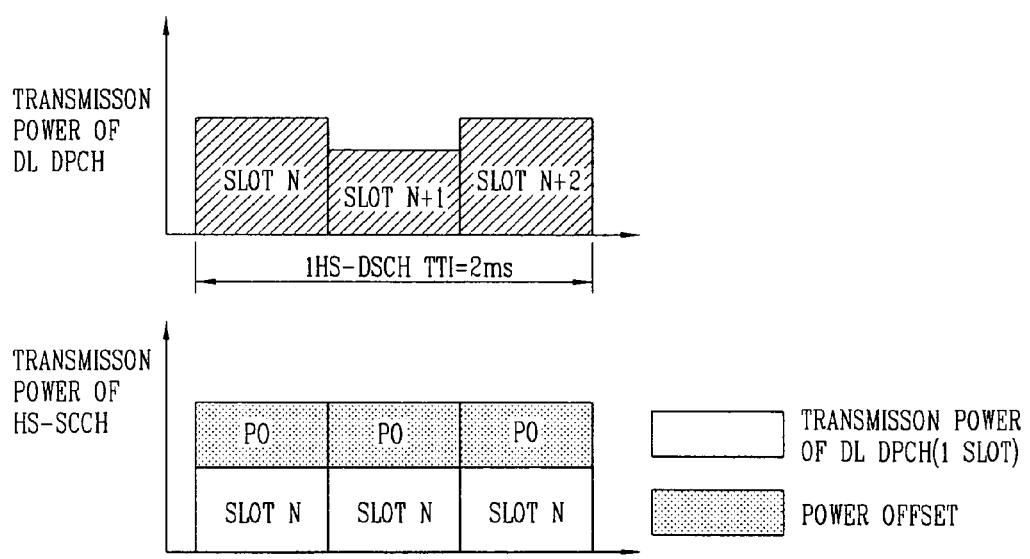
FIG. 9 is a diagram that illustrates a method for controlling transmission power of HS-SCCH in accordance with another embodiment of the present invention.

FIG. 9 is a diagram that illustrates a method for controlling transmission power of HS-SCCH in accordance with another embodiment of the present invention. As shown in FIG. 9, the power control can be substantially equally performed on each slot of HS-SCCH during a sub-frame, so that the controlling can be performed in the unit of slot adopting the second channel coding method, and there is preferably no change in the transmission power of HS-SCCH during 1 TTI (2 ms). At this time, the transmission power for the three slots can be uniformly applied on the basis of transmission power of one of the three slots of DL DPCH. Preferably, the reference slot is the first slot.

Thus, the PO value can be determined as a power offset relative to the transmission power of the first slot (e.g., N) of DL DPCH. The transmission power of HS-SCCH can be determined as a value obtained by combining (e.g., adding) the PO value to the transmission power of the first slot (e.g., N) of DL DPCH.

However, the present invention is not intended to be so limited. For example, the transmission power of HS-SCCH during 1 TTI can be determined by adding the PO to an average transmission power of DL DPCH during a certain slot in the past.

As described above, embodiments of a method for controlling power of HS-SCCH of the present invention have various advantages. Since a transmission power of HS-SCCH is controlled by differentiating part-1 and part-2, the inter-cell interference can be reduced or minimized and system power such as used by a node B can be more effectively used. Further, by constantly controlling the power to part-2 of HS-SCCH transmitted to a particular user or by constantly controlling transmission power of every slot of HS-SCCH, system power transmission can be reduced or the efficiency in power control can be increased.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method, comprising:
dividing control information of a high speed-shared control channel (HS-SCCH) into a first part and a second part, wherein the first part and the second part constitute a sub-frame, wherein the first part includes control information of the HS-SCCH for a plurality of user equipment (UE) and the second part includes control information of the HS-SCCH for a specific UE; and
controlling a transmission power of the first part and the second part to be different according to a power control command of user equipment (UE),
wherein the different transmission power of the first part and the second part is based on corresponding user equipment (UE), and
wherein the transmission power of the first part is determined by adding a first power offset (PO) value to a transmission power of a common pilot channel (CPICH) for the plurality of UE and the transmission power of the second part is controlled by a second power offset (PO) value relative to transmission power of a downlink dedicated physical channel (DL DPCH) for the specific UE.

2. The method of claim 1, wherein transmission power of each slot of the second part is controlled by the second power offset (PO) value relative to each slot of the DL DPCH.

3. The method of claim 2, wherein the second PO value is relative to one of three slots of the DL DPCH.

4. The method of claim 2, wherein transmission power of each slot of the second part is determined by adding the second PO value to transmission power of slots corresponding to the DL DPCH.

5. The method of claim 2, wherein transmission power of each slot of the second part is determined by adding the second PO value to transmission power of one of three slots of the DL DPCH.

6. The method of claim 5, wherein the transmission power of said each slot of the second part is determined by adding the second PO value to an average transmission power of the DL DPCH during a selected slot.

7. A method for controlling transmission power of a communication system, comprising:

receiving power control information from a particular user equipment (UE);

setting transmission power of a downlink dedicated physical channel (DL DPCH) for the particular UE and a common pilot channel (CPICH) for a plurality of UE according to the received power control information; and determining transmission power of a high speed-shared control channel (HS-SCCH) transmitted to each UE by determining transmission power of a first part of a HS-SCCH by adding a first power offset (PO) value to the set transmission power of the CPICH, and by determining transmission power of a second part of the HS SCGH using a second power offset (PO) value relative to the set transmission power of the DL DPCH, wherein the first PO value determines transmission power of the first part of the HS-SCCH configured to transmit a common content in the HS-SCCH and the second PO value determines transmission power of the second part of the HS-SCCH configured to transmit information for the particular UE.

8. The method of claim 7, wherein transmission power of each slot of the second part is controlled by the second PO value relative to each slot of the DL DPCH.

9. The method of claim 8, wherein the second PO value is relative to one of three slots of the DL DPCH.

10. The method of claim 8, wherein the transmission power of each slot of the second part is determined by one of adding the second PO value to transmission power of slots corresponding to the DL DPCH, adding the second PO value to the transmission power of one of three slots of the DL DPCH, and adding the second PO value to an average transmission power of the DL DPCH during a selected slot.

11. A method for controlling transmission power of a high speed shared control channel (HS-SCCH) in a high speed data packet access (HSDPA) service of a universal mobile telecommunications system (UMTS) system in which a user equipment (UE) receives a user data through a high speed downlink shared channel (HS-DSCH) on the basis of control information transmitted through the HS-SGCH, wherein transmission power of a first part and a second part constituting a sub-frame of the HS-SCCH is controlled to be different based on common information transmitted to a plurality of UE and corresponding information transmitted to a selected UE, wherein the transmission power of the first part and the second part is respectively based on a power control of common pilot channel (CPICH) common to all UEs and a power control of a downlink dedicated physical channel (DL DPCH) dedicated to a UE, wherein the transmission power of the first part of the HS-SCCH is determined by adding a first power offset (PO) value to the transmission power of the CPICH and the transmission power of the second part of the HS-SCCH is controlled by a second power offset (PO) value relative to the transmission power of the DL DPCH for the selected UE.

12. The method of claim 11, wherein the transmission power of each slot of the second part is controlled by the second power offset (PO) value relative to each slot of the DL DPCH.

13. The method of claim 12, wherein the second PO value is a power offset value relative to one of three slots of the DL DPCH.

14. The method of claim 12, wherein the transmission power of each slot of the second part is determined by one of adding the second PO value to the transmission power of slots corresponding to the DL DPCH, adding the second PO value to the transmission power of one of three slots of the DL DPCH and adding the second PO value to an average transmission power of the DL DPCH during a prescribed slot.

* * * * *